United States Patent
Freudelsperger (10) Patent No.: US 8,157,081 B2
(45) Date of Patent: Apr. 17, 2012

(54) PROCESS AND AUTOMATIC COMMISSIONING UNIT FOR FILLING AN ORDER CONTAINER

(75) Inventor: Karl Freudelsperger, Hart bei Graz (AT)

(73) Assignee: Knapp AG, Hart bei Graz (AT)

( * ) Notice: Subject to any disclaimer, the term of this patent is extended or adjusted under 35 U.S.C. 154(b) by 297 days.

(21) Appl. No.: 12/530,705

(22) PCT Filed: Mar. 10, 2008

(86) PCT No.: PCT/EP2008/001895
§ 371 (c)(1),
(2), (4) Date: Sep. 10, 2009

(87) PCT Pub. No.: WO2008/113490
PCT Pub. Date: Sep. 25, 2008

(65) Prior Publication Data
US 2010/0096244 A1    Apr. 22, 2010

(30) Foreign Application Priority Data
Mar. 20, 2007 (DE) .......................... 10 2007 013 175

(51) Int. Cl.
*B65G 1/137* (2006.01)
*B65G 17/12* (2006.01)
*B65G 47/40* (2006.01)

(52) U.S. Cl. .................. 198/418.2; 198/347.4; 198/358; 700/216; 700/218

(58) Field of Classification Search .... 198/418.1–418.3, 198/601, 347.4, 358; 414/267, 268, 274, 414/277, 278; 700/216, 218
See application file for complete search history.

(56) References Cited

U.S. PATENT DOCUMENTS

| | | | | | |
|---|---|---|---|---|---|
| 4,385,859 | A | * | 5/1983 | Goossens | 414/267 |
| 4,569,435 | A | * | 2/1986 | McGovney | 198/502.1 |
| 5,096,090 | A | * | 3/1992 | Schwartz et al. | 221/125 |
| 5,308,001 | A | * | 5/1994 | Grecksch et al. | 242/474 |
| 5,468,110 | A | * | 11/1995 | McDonald et al. | 414/273 |
| 6,059,508 | A | * | 5/2000 | Wunscher et al. | 414/276 |

FOREIGN PATENT DOCUMENTS

| | | |
|---|---|---|
| DE | 29 38 757 A1 | 4/1981 |
| EP | 0 231 360 | 8/1987 |
| WO | WO 87/00855 | 2/1987 |

* cited by examiner

*Primary Examiner* — Mark A Deuble
(74) *Attorney, Agent, or Firm* — McGlew and Tuttle, P.C.

(57) ABSTRACT

A method and an automatic picking machine is provided for filling an order container by means of an ejector and conveyor belt. An ejector is provided configured as a revolving belt directly as a substantially horizontal product storage element. The stored products (3) to be picked are placed onto the conveyor belt (2) or directly into the order container (10) upon actuation of the revolving belt. The preferably bulky non-stackable products (3) are located preferably individually in product compartments (5) of the ejector and are ejected individually.

23 Claims, 7 Drawing Sheets

PROCESS AND AUTOMATIC COMMISSIONING UNIT FOR FILLING AN ORDER CONTAINER

CROSS REFERENCE TO RELATED APPLICATIONS

This application is a U.S. National Phase application of International Application PCT/EP2008/001895 and claims the benefit of priority under 35 U.S.C. §119 of German Patent Application DE 10 2007 013 175.7 filed Mar. 20, 2007, the entire contents of which are incorporated herein by reference.

FIELD OF THE INVENTION

The present invention pertains to a process and an automatic commissioning unit for filling an order container by means of ejectors and a conveyor belt.

BACKGROUND OF THE INVENTION

An automatic commissioning unit with ejectors for commissioning products onto a conveyor belt, in which the products commissioned onto the conveyor belt are transported to an order container and are released into this order container, is known from EP 0 213 360 A1. A product storage means, which extends as a vertical shaft slightly inclined in relation to the vertical direction of the automatic commissioning unit, is arranged in front of and above each ejector. Products of the same class are stacked up in direct contact one on top of another in the vertical shaft. The horizontal ejector located at the deepest point of the product stack pushes out, when necessary, the lowermost product of the stack in the direction of the conveyor belt. If the lowermost product has been pushed out, the product stack is displaced downward by the height of one product under its own weight. Products can thus be ejected or commissioned in a separate manner. The drawback is, besides the limited height of the product stack or product storage capacity, especially that only stackable products can be stored and commissioned, mostly in a cuboid form. Bulky products cannot be handled. If bulky, i.e., nonstackable products shall be jointly commissioned, these products must be commissioned by a human operator manually from a storage container and either placed on the conveyor belt or introduced directly into the order container.

The object of the present invention is to create a process and an automatic commissioning unit of the type mentioned in the introduction for filling an order container, in which bulky, i.e., nonstackable products can also be commissioned reliably, rapidly and effectively.

SUMMARY OF THE INVENTION

The basic object of the present invention is accomplished by a process and commissioning unit according to the invention.

The essence of the present invention in a process and automatic commissioning unit mentioned in the introduction for filling an order container by means of ejectors and a conveyor belt is that products to be commissioned are stored in the ejectors themselves, which are designed as a circulating belt, as a horizontal product row when the circulating belt is stopped, and are released onto the conveyor belt or directly into the order container by actuating the circulating belt. The ejector is consequently designed according to the present invention itself as a (main) product storage means of the automatic commissioning unit—not as, e.g., an auxiliary storage means, for example, adjoining a flow shelf. The ejector according to the present invention does not have to extend exactly horizontally. It is obvious that it may also be inclined and hence arranged obliquely in relation to the horizontal. Identical products belonging to the same class are primarily stored in a single product storage means. When the circulating belt is actuated, a minimum filling level of products stored on the circulating belt is automatically measured and the circulating belt is automatically stopped for refilling products In particular, the circulating belt can be moved backwards for refilling products by a predetermined amount automatically or by manual actuation. The minimum filling level of products being stored on the circulating belt can be displayed optically or/and acoustically.

Each product to be commissioned may preferably be introduced into and stored, separately, on a product storage place of the circulating belt, preferably in a product compartment, and the products being stored on the product storage places, especially in the product compartments, may be released separately.

When speaking of a circulating belt, this may also be a circulating link chain, a cleat belt or nap belt or the like within the framework of the present invention.

In particular, bulky, irregularly configured products—products for which handling cannot be automated with the ejectors known from the state of the art described in the introduction—can be stored and commissioned into an automatic commissioning unit by the present invention in such a manner that this can be handled by means of an automatic commissioning unit. The handling of products of nearly any desirable dimensions or shapes can be automated, such as teddy bears, peanut bags, coffee packs, gauze bandages and the like. Cuboid dimensions are not necessary. Stackability of the products is not a prerequisite.

One or more products are thrown onto the conveyor belt positioned at the head end of the circulating belt if necessary. The conveyor belt is preferably the central belt of the automatic commissioning unit itself. The ejector may be actuated with conventional central belt technology. Products are now thrown onto an area of the central belt that is assigned to an order at the correct point in time.

It is, furthermore, advantageous that the manual operation of filling the product storage means is uncoupled in time from the commissioning operation ("stock in the pipeline"). Refilling guided by filling level display at the end of the pipeline is possible. The present invention makes possible any desired design combination with existing automatic central belt units (modular design). Essentially horizontal product storage means are possible not only next to each other, arranged at a distance or without a distance from one another, but also in two or more levels one on top of another. Various pipeline widths and different distances between naps or transverse walls may be set up depending on the dimensions of the products.

The products stored in product compartments may be preferably released partly sliding onto the conveyor belt under their own weight. Conventional product columns with stackable products may also be stored in vertical shafts in the automatic commissioning unit and fed to the conveyor belt by means of lower, conventional pushing ejectors.

The ejector according to the present invention may be used for filling level management and/or automatic inventory control.

The product storage places, especially the product compartments, may also be defined as virtual deposition sites for products.

The present invention will be described in more detail below on the basis of exemplary embodiments with reference to the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
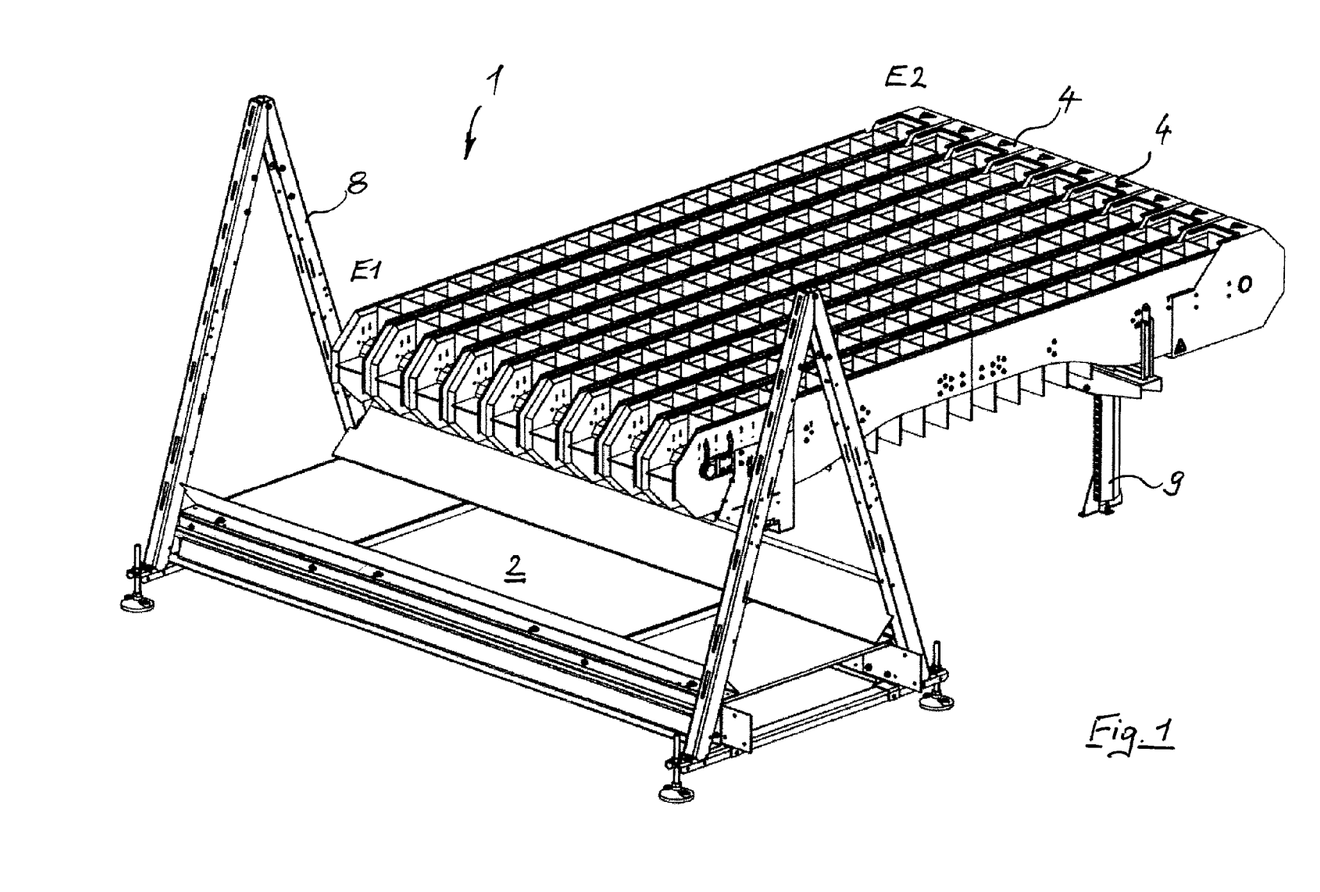
FIG. 1 is a schematic perspective view of an automatic commissioning unit according to the present invention with a central conveyor belt and ejectors in the form of horizontal product storage means located in one plane.
Figure 4:
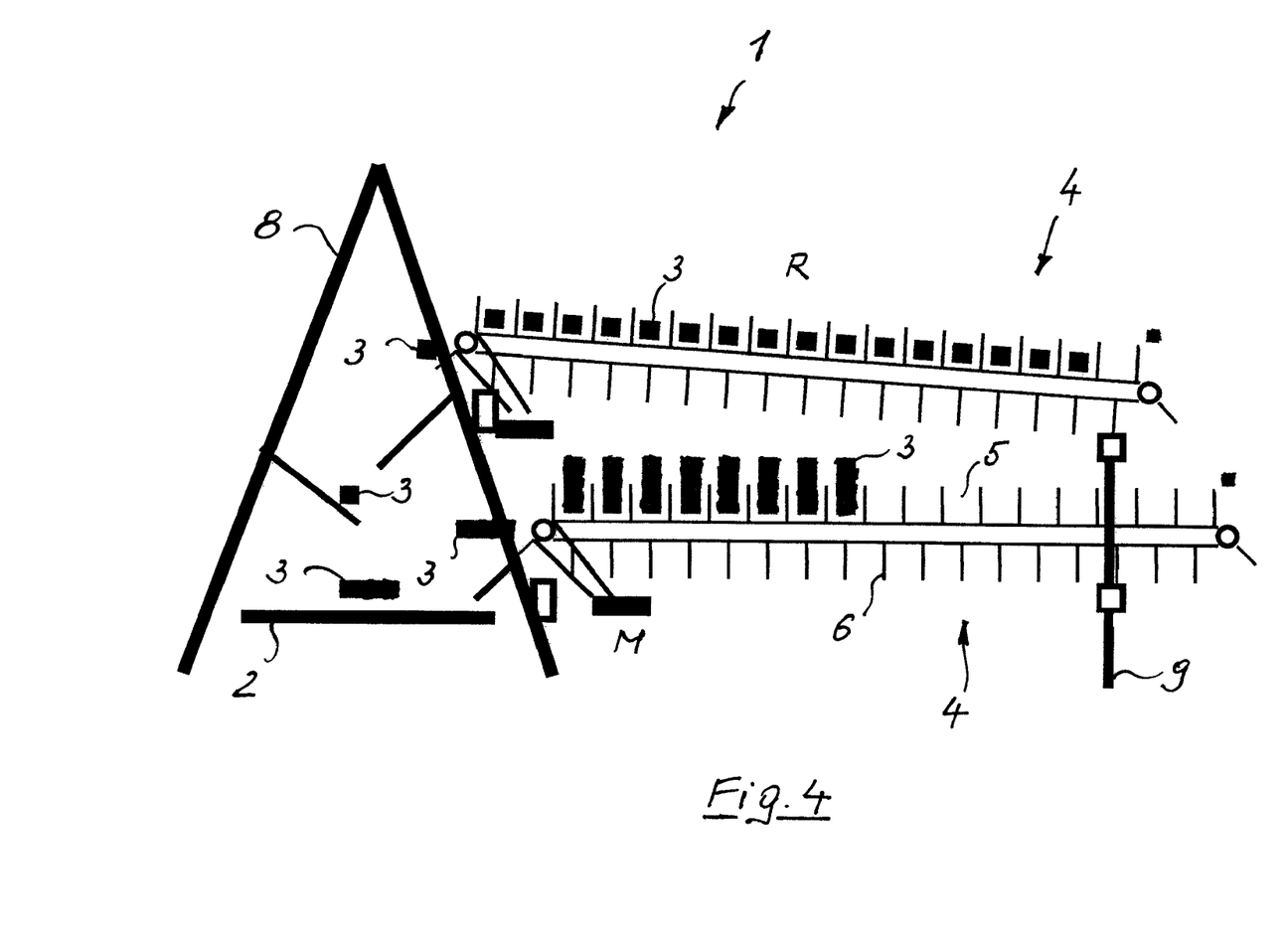
FIG. 4 is a schematic side view of the automatic commissioning unit according to FIG. 1 with another plane of horizontal product storage means.
Figure 5:
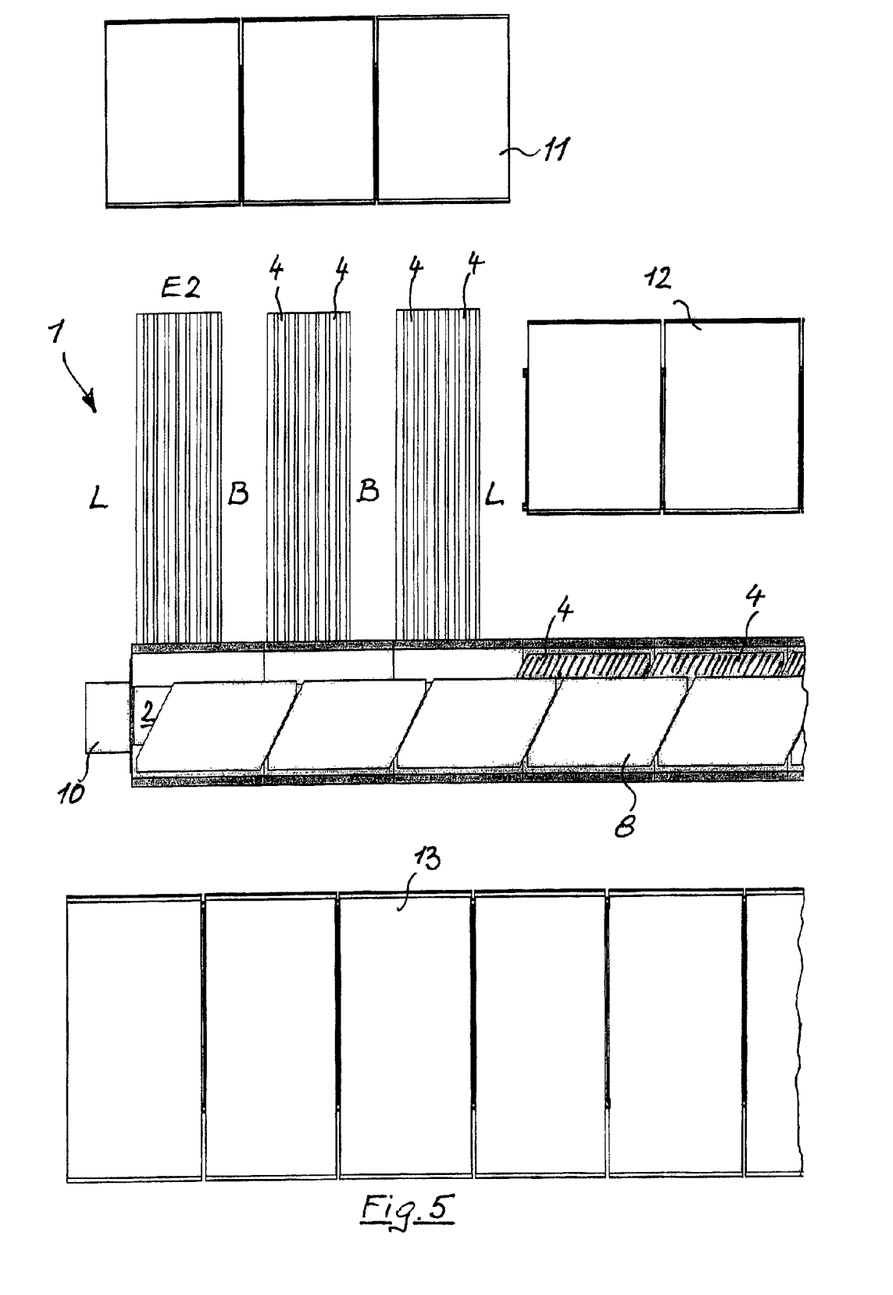
FIG. 5 is a schematic top view of an automatic commissioning unit according to the present invention together with adjacent overstock shelves.

Referring to the drawings in particular, according to FIGS. 1, 4 and 5, an automatic commissioning unit 1 comprises ejectors in the form of horizontal product storage means for commissioning products 3 onto a conveyor belt 2, wherein the products 3 commissioned onto the conveyor belt are transported to an order container 10 and are released into this order container. The order container contains the products of a single commissioned order.

The automatic commissioning unit 1 is a so-called automatic central belt unit and has such a lower, horizontal conveyor belt 2 in the form of a so-called central belt, which extends longitudinally centrally in relation to the A-frame 8 of the automatic commissioning unit.

Assigned to the automatic commissioning unit 1 are overstock containers or shelves 11, 12 on one longitudinal side of the automatic commissioning unit 1 proper according to the top part of FIG. 5, and overstock containers or shelves 13 on the other longitudinal side according to the bottom part of FIG. 4, namely, in the reaching area of the hands of human operators, who fill the automatic commissioning unit with products on both sides. It can be seen that a minimum product filling level has been reached during a commissioning.

The longitudinal side of the automatic commissioning unit 1 located to the left of the A-frame 8 in FIG. 4 is filled with stackable products from the overstock shelf 13 as in the state of the art described in the introduction. The products are then located in a stack in vertical commissioning shafts, which are located in the left oblique plane of the A-frame 8 according to FIG. 4.

The longitudinal side of the automatic commissioning unit 1 located to the right of the A-frame 8 in FIG. 4 is filled according to the present invention, by contrast, with bulky, i.e., nonstackable products 3 from the overstock shelves 11 and 12, as will be described below.

The horizontal product storage means according to the present invention is a drivable circulating belt 4, which can be actuated for the separate ejection of a product 3 onto the conveyor belt 2, with product storage places, especially with product compartments 5, which extend in a dense row along the circumference.

Figure 2:
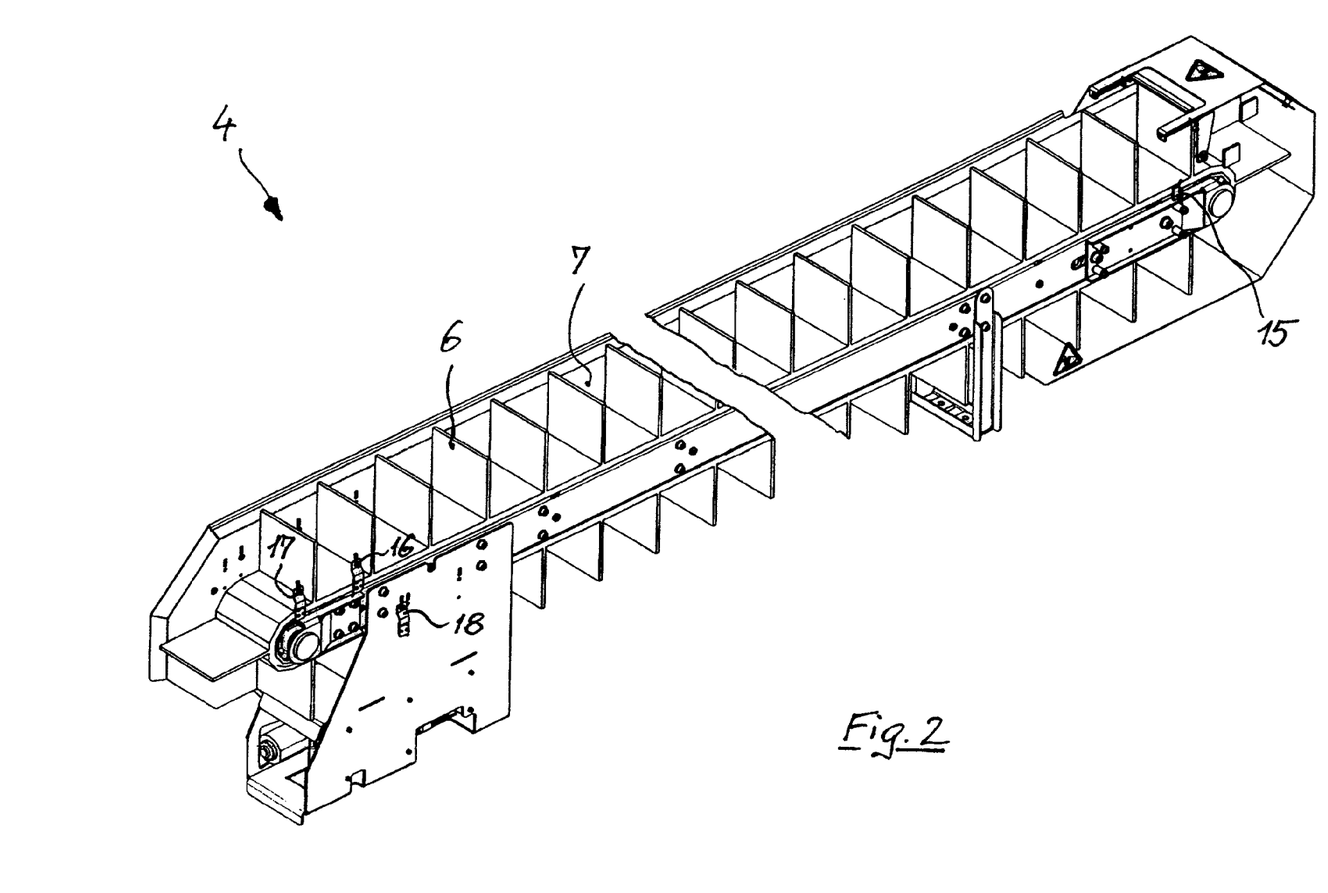
FIG. 2 is a perspective view of a product storage means according to FIG. 1.
Figure 7:
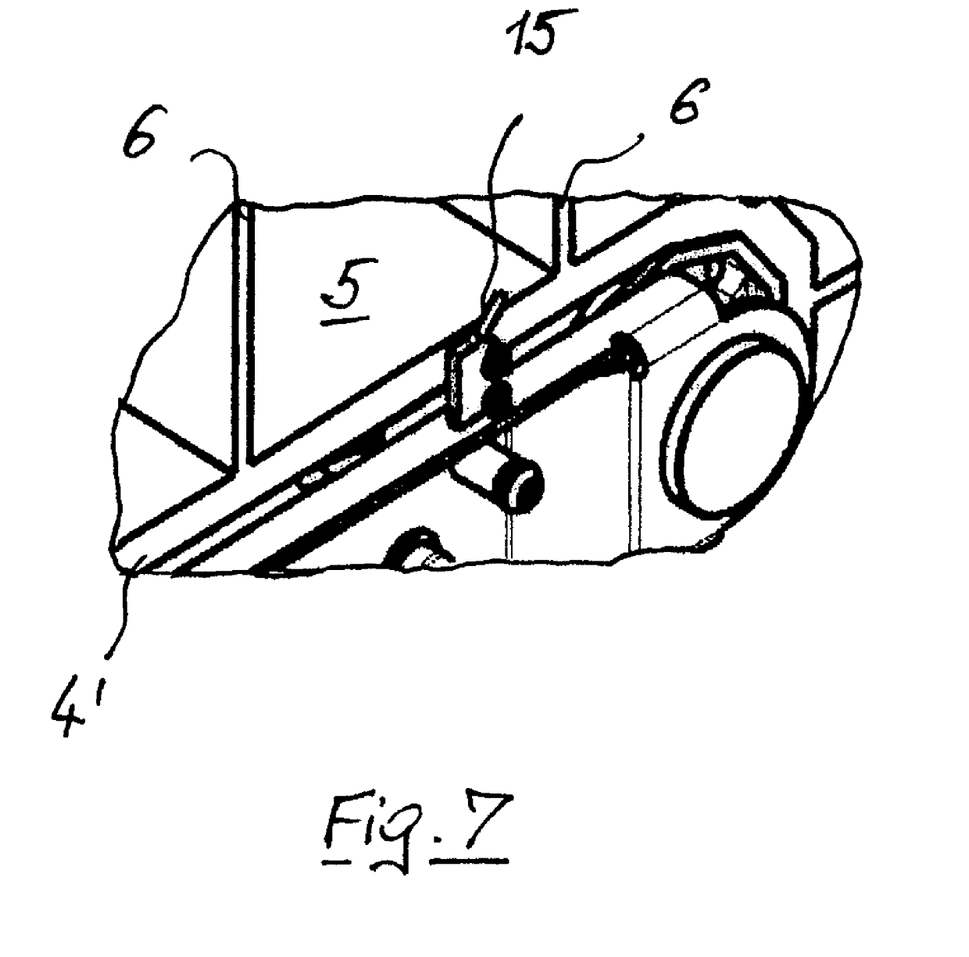
FIG. 7 is a detail view taken from the right-hand part of FIG. 2.

The product compartments 5 have vertical naps, bars or transverse walls 6 according to FIGS. 2 and 7, which extend over the entire width of the circulating belt 4, preferably at right angles to the circulating belt.

In another embodiment variant, the product storage places, especially the product compartments 5, may be arranged in a dense row along the circulating length of the circulating belt 4 and defined as virtual deposition sites for products 3.

The distance between adjacent naps, bars or transverse walls 6 is adjustable.

Figure 3:
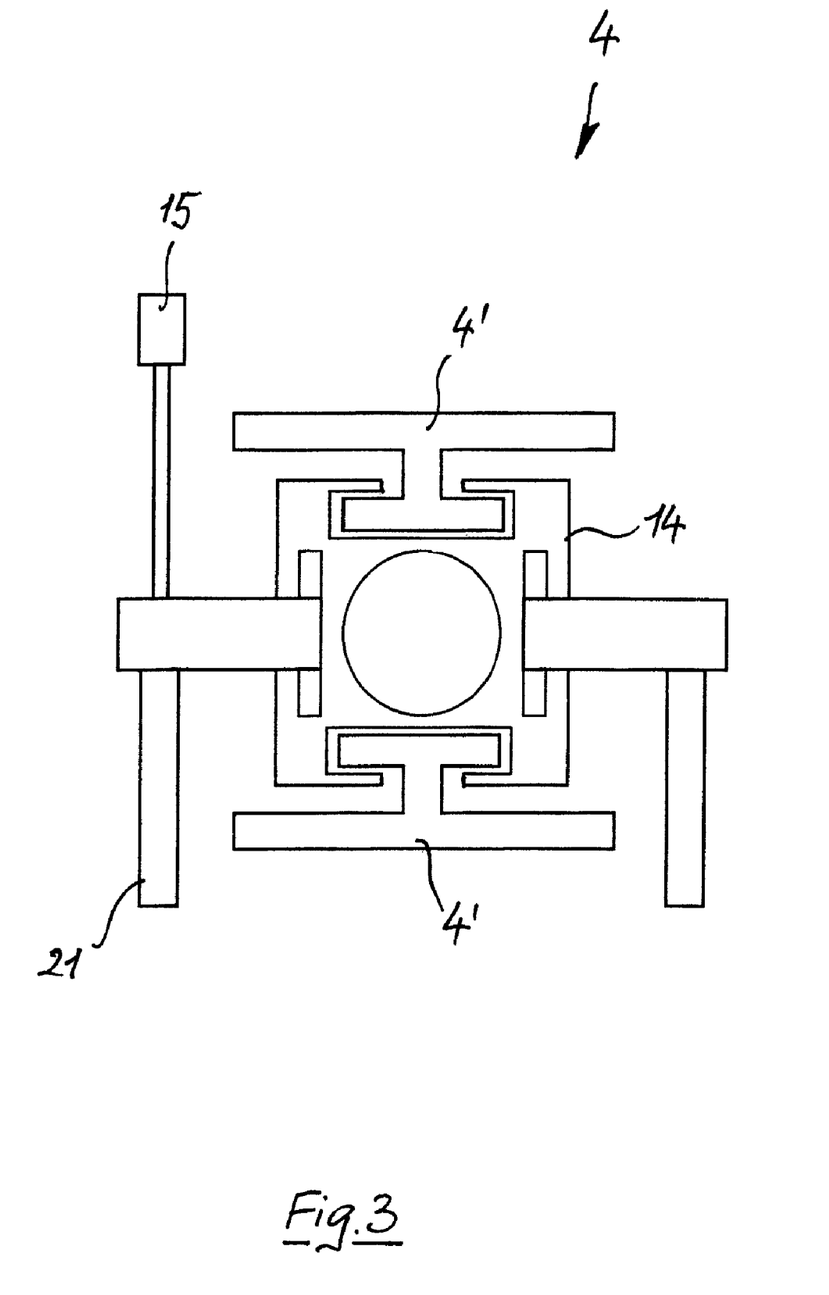
FIG. 3 is a schematic cross sectional view through a product storage means with omission of the longitudinal side walls.

The circulating belt 4 according to FIG. 3 has a profile 4' having a double T-shaped cross section, which is displaceably guided in a self-supporting aluminum profile 14 and is driven by a motor M on the head side of the circulating belt 4 according to FIG. 4. Brackets 21 are arranged laterally from the profile 4' for a sensor system as well as lateral guides (not shown) and covers. The aluminum profile 4' transmits the weight of the products 3 to a module bracket or the A-frame 8. The weight of the products 3 is supported at the rear longitudinal end E2 of the circulating belt 4 on the floor via vertical supports 9.

The sensor system of each circulating belt 4 comprises four sensors. A refill sensor 15 according to FIG. 2, which is shown in an enlarged detail view in FIG. 7, is located in the rear part of the circulating belt. An empty sensor 16 and an ejection sensor 17 according to FIGS. 2 and 6a through 6d are located in the front head part of the circulating belt 4 on the upper side of the circulating belt, and a positioning sensor 18 or nap sensor, which is needed for accurately positioning the circulating belt, are located on the underside.

The circulating belt 4 may be composed of chain links

Individual chain links may be designed as transverse walls, which can be installed at desired longitudinal distances to form an individual product compartment 5.

The carrying run of the circulating belt 4 has stationary vertical longitudinal side walls 7 according to FIG. 2.

The distance between the two longitudinal side walls 7 may optionally be made adjustable.

One longitudinal end E1 of the circulating belt 4 is located above or in the area of the conveyor belt 2, and each product storage place, especially each product compartment 5, is provided for a single product 3.

In the top view, the circulating belt 4 extends at right angles or obliquely to the conveyor belt 2.

The product storage places, especially the product compartments 5, of the carrying run of the circulating belt 4 can be equipped with products.

A plurality of horizontal circulating belts 4 are arranged preferably directly next to one another, as this can be seen especially in FIG. 1.

According to FIG. 5, an operating space B for laterally filling the product storage means by a human operator may be provided between circulating belts 4 arranged next to each other.

Even though only a single horizontal plane is shown in FIG. 1 at horizontal circulating belts in one embodiment variant, a plurality of horizontal circulating belts 4 are arranged one on top of another in another embodiment variant, as this is schematically shown in FIG. 4.

Circulating belts 4 located higher are optionally placed obliquely and are located deeper on the side facing away from the conveyor belt 2.

The aforementioned, essentially horizontal circulating belts 4 are shown in the arrangement according to the top left part of FIG. 5. A human operator fills these circulating belts 4, if necessary, from the rear longitudinal end E2 of the circulating belts, from the longitudinal side L or from the operating space B. The human operator brings the nonstackable products 4 needed for filling from the overstock shelves 11 located within reach. The human operator confirms the performed filling by actuating a button.

Furthermore, circulating belts 4, which are operated by a human operator, are provided in the nearly vertical plane of the A-frame 8 of the automatic commissioning unit 1 in the exemplary embodiment according to FIG. 5 on the upper longitudinal commissioning side, on the right side. The human operator fills these vertical circulating belts 4 when needed with nonstackable, rarely commissioned products ("slow turnover items"), which are kept ready in the overstock shelves 12 located within easy reach.

To fill an order container 10 in an automatic commissioning unit 1 by means of ejectors and conveyor belt 2, products 3 to be commissioned are stored in the ejector itself, designed as a circulating belt 4, as a horizontal product row R preferably when the circulating belt 4 is stopped and released onto the conveyor belt 2 or directly into the order container 10 by actuating the circulating belt.

Each product 3 to be commissioned is entered separately, on a product storage place each of the circulating belt 4, preferably into a product compartment 5 of the circulating belt, and stored, and the products being stored on the product storage places, especially in the product compartments, are released separately.

The products 3 being stored in the product compartments 5 are released during commissioning onto the conveyor belt 2 according to FIG. 4 under their own weight, partly sliding.

A filling operation of a circulating belt 4 from the rear end E2 will be described below on the basis of FIGS. 6a through 6d.

Figure 6A:
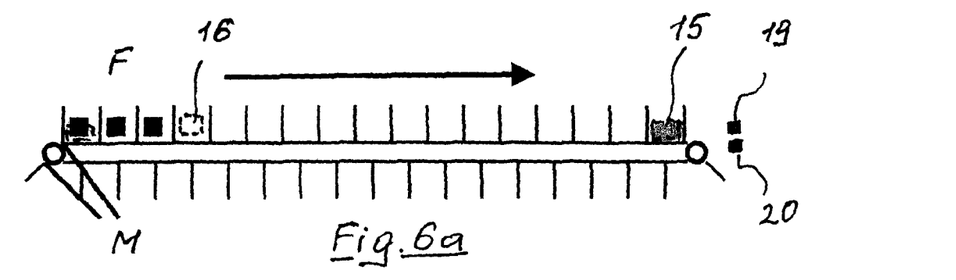
FIG. 6a is a product storage means according to FIG. 4 shown in one of four positions of a filling of products from the rear according to the right side of the drawing.
Figure 6B:
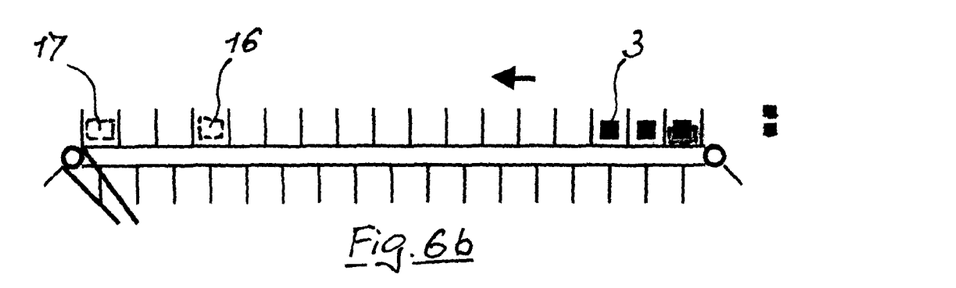
FIG. 6b is a product storage means according to FIG. 4 shown in another one of four positions of a filling of products from the rear according to the right side of the drawing.
Figure 6C:
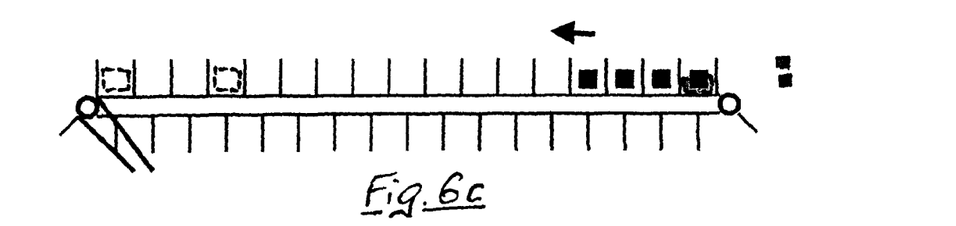
FIG. 6c is a product storage means according to FIG. 4 shown in another one of four positions of a filling of products from the rear according to the right side of the drawing.
Figure 6D:
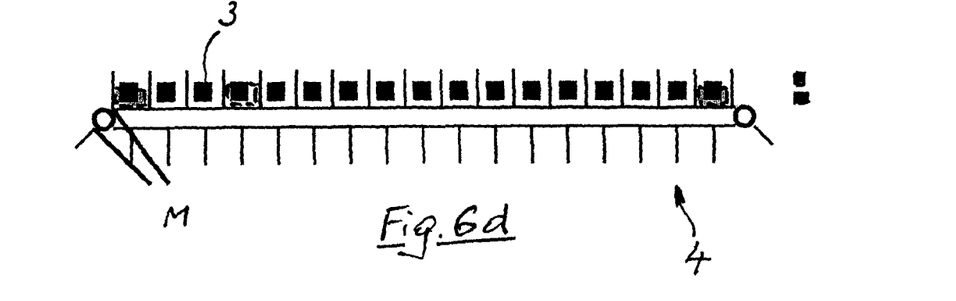
FIG. 6d is a product storage means according to FIG. 4 shown in another one of four positions of a filling of products from the rear according to the right side of the drawing.

With the circulating belt 4 actuated, a minimum filling level F of products 3 being stored on the circulating belt is automatically measured and the circulating belt, which is moving counterclockwise during a commissioning operation according to FIG. 6a, is automatically stopped. Stopping is brought about according to FIG. 6a by the empty sensor 16, which recognizes the empty space of the assigned product compartment in the absence of a product 3 and it not only stops the circulating belt but also sends an optical and/or acoustic message to the half-empty display 19 at the rear end of the circulating belt 4. The human operator then recognizes from the half-empty display the fact that the minimum degree of filling is not reached and is directed to this circulating belt. A button 20 for requesting filling, with which the horizontal product row of the minimum filling level F is moved in the direction of the arrow according to FIG. 6a into the rearmost position of the circulating belt according to FIG. 6b, is arranged at the rear end of the circulating belt. The refilling sensor 15 recognizes there the presence of the product row and moves again to the left by one product compartment according to the direction of the arrow in FIG. 6b. According to FIG. 6c, the human operator now fills a product 3 into the rearmost product compartment, and the refill sensor 15 moves the circulating belt by one product compartment in the direction of the arrow in FIG. 6c. The human operator now fills one product 3 after another, always into the rearmost product compartment, until the ejection sensor 17 at the head of the circulating belt recognizes the filled frontmost product compartment and stops the circulating belt. If the circulating belt or the product storage means is filled according to FIG. 6d, the human operator is prompted by the display 19 to again confirm the performed filling with the button 20. The ejector is inactive for the duration of filling. Since filling usually takes place outside the commissioning times, this is not a problem.

Consequently, the circulating belt 4 is moved backwards by a predetermined amount automatically or by manual actuation for refilling products 3, and the minimum filling level F of products being stored on the circulating belt 4 is displayed optically and/or acoustically.

The ejector may be used to manage the filling level and/or to automatically control inventory.

In particular, the ejector manages the degree of filling by counting the ejections that have taken place since the last filling by means of the ejection sensor 17 and relating them to the overall pipeline length or product storage means length.

The control computer of the automatic commissioning unit can prompt the pipeline or product storage means for inventory for an automatic inventory control. The pipeline now moves its product row R backwards and again forwards only once and counts the free product compartments.

The needed feeding of products can also be detected. The refilled quantity is automatically detected by the guided filling of the pipelines at the rear end and a report on this quantity can be passed on to a higher-level inventory management system.

While specific embodiments of the invention have been described in detail to illustrate the application of the principles of the invention, it will be understood that the invention may be embodied otherwise without departing from such principles.

The invention claimed is:

1. A process for filling an order container in an automatic commissioning unit by means of ejectors and a conveyor belt, the process comprising the steps of:
    storing products to be commissioned in the ejector itself, designed as a circulating belt, in an essentially horizontal product row while the circulating belt is stopped;
    releasing the stored products onto the conveyor belt or directly into an order container by actuating the circulating belt;
    automatically measuring a minimum filling level of products being stored on the circulating belt when the circulating belt is actuated and the circulating belt is automatically stopped for refilling products, wherein the circulating belt is moved backwards by a predetermined amount automatically or by manual actuating for refilling products.

2. A process in accordance with claim 1, wherein the minimum filling level of products being stored on the circulating belt is displayed optically and/or acoustically.

3. Automatic commissioning unit in accordance with claim 1, wherein each product to be commissioned is introduced separately on a product storage place of the circulating belt, and/or into a product compartment of the circulating belt, and stored, and the products being stored on the product storage places, and/or in the product compartments, are released separately.

4. A process in accordance with claim 3, wherein the products are introduced manually into the product compartments from a longitudinal side of the circulating belt or from a longitudinal end of the circulating belt, which said longitudinal end faces away from the conveyor belt.

5. A process in accordance with claim 3, wherein the products stored in the product compartments are released onto the conveyor belt partly sliding under their own weight.

6. A process in accordance with claim 1, wherein product columns are also stored in vertical shafts in the automatic commissioning unit and are fed to the conveyor belt by means of pushing ejectors arranged under the shafts.

7. A process in accordance with claim 1, wherein the ejector is used to manage the filling level and/or for automatic inventory control.

8. An automatic commissioning unit comprising:
a conveyor belt;
ejectors for commissioning products onto the conveyor belt, wherein the products commissioned onto the conveyor belt are transported to an order container and are released into this order container to define product storage means for storing products to be commissioned in the ejector itself, designed as a circulating belt, in an essentially horizontal product row while the circulating belt is stopped, releasing the stored products onto the conveyor belt or directly into the order container by actuating the circulating belt and automatically measuring a minimum filling level of products being stored on the circulating belt when the circulating belt is actuated and the circulating belt is automatically stopped for refilling products wherein the ejector is designed in the form of an essentially horizontal product storage means, said product storage means being a drivable circulating belt, which can be actuated for the separate ejection of a product onto the conveyor belt, with product storage places, and/or with product compartments, in a dense row along the circumference, wherein one longitudinal end of the circulating belt is located above or in the area of the conveyor belt and each product storage place, and/or each product compartment, is provided for a single product, wherein circulating belts located higher are positioned obliquely and deeper on the side facing away from the conveyor belt.

9. An automatic commissioning unit in accordance with claim 8, wherein the circulating belt extends in a top view at right angles or obliquely to the conveyor belt.

10. An automatic commissioning unit in accordance with claim 8, wherein the product storage places and/or product compartments, of the carrying run of the circulating belt can be equipped with products.

11. An automatic commissioning unit in accordance with claim 8, wherein a plurality of horizontal circulating belts are arranged directly next to each other.

12. An automatic commissioning unit in accordance with claim 11, wherein an operating space for the lateral filling of the product storage means by a human operator is provided between circulating belts arranged next to each other.

13. An automatic commissioning unit in accordance with claim 8, wherein a plurality of horizontal circulating belts are arranged one on top of another.

14. An automatic commissioning unit in accordance with claim 8, wherein the conveyor belt is the central belt of the automatic commissioning unit.

15. An automatic commissioning unit in accordance with claim 8, wherein vertical product storage means are also provided in the form of commissioning shafts with lower, additional ejectors in the form of pushing ejectors.

16. An automatic commissioning unit in accordance with claim 8, wherein the product storage places, and/or the product compartments, are arranged in a dense row along the circumferential length of the circulating belt and are defined as virtual deposition sites for products.

17. An automatic commissioning unit in accordance with claim 8, wherein the product compartments have vertical naps, bars or transverse walls, which extend over the entire width of the circulating belt at right angles to the circulating belt.

18. An automatic commissioning unit in accordance with claim 17, wherein the distance between adjacent naps, bars or transverse walls is adjustable.

19. An automatic commissioning unit in accordance with claim 8, wherein the circulating belt is composed of chain links.

20. An automatic commissioning unit in accordance with claim 19, wherein individual chain links are designed as transverse walls, which can be installed at different longitudinal distances to form an individual product compartment.

21. An automatic commissioning unit in accordance with claim 8, wherein the carrying run of the circulating belt has stationary vertical longitudinal side walls.

22. An automatic commissioning unit in accordance with claim 21, wherein the distance between the two longitudinal side walls is adjustable.

23. An automatic commissioning unit comprising:
a conveyor belt;
ejectors for commissioning products onto the conveyor belt, wherein the products commissioned onto the conveyor belt are transported to an order container and are released into this order container to define product storage means for storing products to be commissioned in the ejector itself, designed as a circulating belt, in an essentially horizontal product row while the circulating belt is stopped, releasing the stored products onto the conveyor belt or directly into the order container by actuating the circulating belt and automatically measuring a minimum filling level of products being stored on the circulating belt when the circulating belt is actuated and the circulating belt is automatically stopped for refilling products wherein the ejector is designed in the form of an essentially horizontal product storage means, wherein vertical product storage means are provided in the form of commissioning shafts with lower, additional ejectors in the form of pushing ejectors.

* * * * *